Patented July 9, 1940

2,207,074

UNITED STATES PATENT OFFICE 2,207,074

OXYGEN GENERATING COMPOSITION

Nathan Smith, Jackson Heights, N. Y.

No Drawing. Application November 25, 1938,
Serial No. 242,289

6 Claims. (Cl. 167—93)

The invention relates to a composition of matter, and more particularly to a composition for the generation of oxygen, and includes correlated improvements and discoveries whereby the production of oxygen is enhanced.

Utilization has previously been made of sodium perborate as a compound for the production of oxygen, and use in the dental profession for the treatment of various diseases of the mouth has been rather extensive. Its use in a dentifrice has been per se and in conjunction with an abrasive substance, as precipitated calcium carbonate, and also with a flavoring agent.

A distinct disadvantage attends the utilization of sodium perborate in the mouth inasmuch as in the reaction for the generation of oxygen a considerable amount of caustic alkali, namely, sodium hydroxide, is formed, which is deleterious to the mouth tissues and frequently leads to relatively serious conditions.

A further disadvantage attending the former use of sodium perborate has been the slow and incomplete liberation of the oxygen because of the low rate of solubility in water. Moreover, many medical and dental reports attest to the ill effects of the caustic alkali on the membranes of the mouth, and this especially in cases of individuals who have an alkali idiosyncrasy.

An object of the invention is the provision of a composition containing a perborate in which the foregoing disadvantages are obviated.

Another object of the invention is to provide a composition which readily generates oxygen and in nascent condition.

A further object of the invention is the provision of a composition containing a perborate which dissolves easily in water and which yields a substantially neutral aqueous solution.

An additional object of the invention is the production of a perborate composition which is stable, and hence retains its oxygen yielding capacity for extended periods.

A particular object of the invention provides for a sodium perborate composition from which all available oxygen may be released with a resulting neutral solution.

A specific object of the invention is to provide a composition for the generation of oxygen which contains sodium perborate and an aluminum sulfate having an acid reaction.

Other objects of the invention will in part be obvious and will in part appear hereinafter.

The invention accordingly comprises a composition of matter possessing the characteristics, properties and the relation of components which will be exemplified in the composition hereinafter described, and the scope of the invention will be indicated in the claims.

In the practice of the invention a composition for the generation of oxygen may be provided through the combination of a perborate and an acid reacting aluminum sulfate. Such a composition liberates oxygen with facility and to substantial completeness with a neutralization of the alkali which is attendingly produced.

Further, a composition containing a perborate and an acid reacting aluminum sulfate possesses a characteristic stability, and hence the original oxygen liberating property is retained over extended periods of time. Moreover, the compositions containing an acid reacting aluminum sulfate dissolve readily and in a small quantity of water with an immediate release of substantially all of the available oxygen and neutralization of the alkali set free. More especially, the perborate may be in the form of a calcium or magnesium compound, or as an alkali metal salt, including ammonium, i. e., the perborates of sodium, potassium and ammonium. These perborates, moreover, may be in anhydrous or fully hydrated form, but preferably are in monohydrated condition.

Particularly, the composition may include sodium perborate in conjunction with an aluminum sulfate having an acid reaction. Such a composition is markedly stable, dissolves readily, and generates substantially all of the available oxygen. Additionally, the alkali, i. e., sodium hydroxide formed, is neutralized by the acid with the production of aluminum hydroxide in suspension. The aluminum hydroxide is without deleterious effect, and when the perborate and sulfate are present in proper proportions, the pH of the resulting solution is substantially that of saliva.

As an illustrative embodiment of a manner in which the invention may be practiced, the following example is presented. 20 parts of sodium perborate are combined with 12 parts of sodium aluminum sulfate. Preferably, the perborate is in monohydrated condition, and both salts are dried and powdered. The composition produced by this combination has an available oxygen content of about 9.5%, which is substantially the strength of U. S. P. sodium perborate. When 10 parts of the composition are treated with 20 parts of water the composition dissolves readily and the resulting solution has a pH value of about 6.3. Saliva has a pH value of 6.5 and the U. S. P. sodium perborate when similarly treated gives a pH value of 9.5. Additionally, when 10 parts of the composition above mentioned is contacted with about 100 parts of water, a yield of 99% of available oxygen is obtained. On the other hand, U. S. P. sodium perborate when contacted in a similar manner, yields only about 23% of its available oxygen.

The composition hereinabove described may be used for the generation of oxygen in connection with any reaction in which oxygen is to be employed, and it may also be utilized in the preparation of a dentifrice. When included in a dentifrice there would be present also other substances usual in such preparations, of which mention may more particularly be made of calcium carbonate, magnesium carbonate, tricalcium phosphate, amorphous silica, and a desired and suitable flavoring material. In the place of sodium aluminum sulfate, specifically mentioned above, other acid reacting aluminum sulfates may be employed as, for example, aluminum sulfate, potassium aluminum sulfate, and ammonium aluminum sulfate.

Suggestions have been made in Patents 975,353, 975,354 and 2,094,671 for the use of acids and acid reacting compounds along with sodium perborate for the purpose of releasing oxygen therefrom. Substances mentioned are citric acid, tartaric acid, sodium bitartrate and monocalcium phosphate. The composition herein described constitutes an improvement relative to these earlier suggestions, inasmuch as the mixtures therein mentioned do not yield a full strength U. S. P. compound. On the other hand, the perborate-acid reacting sulfate mixture of the present invention gives a full strength oxygen composition. Moreover, acids, as citric and tartaric, in conjunction with sodium perborate, yield mixtures which are distinctly unstable, even when the compounds are in a dry condition. Furthermore, neither sodium bitartrate nor monocalcium phosphate suffice to neutralize the alkali set free from sodium perborate in order to produce a solution which is neutral with a yield of 9-10% of oxygen, based on the weight of the mixture.

By way of example, 100 parts of sodium perborate monohydrate will require 60 parts of sodium aluminum sulfate, or 130 parts of monocalcium phosphate, or 172 parts of sodium bitartrate, to yield a solution which is substantially neutral or free from alkali. Use of the sodium aluminum sulfate, of the present invention, gives an oxygen yield of 9.35%, whereas that with monocalcium phosphate is 6.5% and with sodium bitartrate 5.5%.

Perborate compositions produced in accordance with the foregoing description give a yield of about 9-10% of oxygen when utilizing sodium perborate monohydrate, whereas the U. S. P. sodium perborate yield is also about 9% of oxygen. Additionally, the compositions of the invention possess distinctive advantages inasmuch as they are stable, thus retaining oxygen yielding properties for extended periods of time, dissolve readily in a small amount of water, liberate substantially all of the available oxygen, neutralize substantially all of the alkali liberated upon contact of the perborate with water, give a solution having a pH value substantially that of saliva, e. g., 6.3, and when used as a dentifrice, generate oxygen in the mouth in nascent condition without harmful effects upon the mucous membrane.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A dentifrice capable of generating oxygen, which comprises, in preponderant amount, a perborate, and an acid reacting aluminum sulfate, said composition being in dry form, and stable.

2. A dentifrice capable of generating oxygen, which comprises, in preponderant amount, a sodium perborate and an acid reacting aluminum sulfate, said composition being in dry form, and stable.

3. A dentifrice capable of generating oxygen, which comprises, in preponderant amount, sodium perborate and an acid reacting aluminum sulfate, said sulfate being present in an amount sufficient to neutralize substantially all of the alkali liberated when said perborate contacts with water, and said composition being in dry form, and stable.

4. A dentifrice capable of generating oxygen, which comprises, in preponderant amount a sodium perborate and sodium aluminum sulfate, said composition being in dry form, and stable.

5. A dentifrice capable of generating oxygen, which consists of sodium perborate monohydrate about 20 parts, in conjunction with dry sodium aluminum sulfate about 12 parts, said composition being in dry form, stable, and dissolving readily in water yielding a solution having a pH value of about 6.3.

6. A stable, dry, powdered dentifrice capable of generating oxygen, containing as its principal active ingredient a perborate and an acid reacting aluminum sulfate in an amount sufficient to stabilize said perborate.

NATHAN SMITH.